Figure 1:
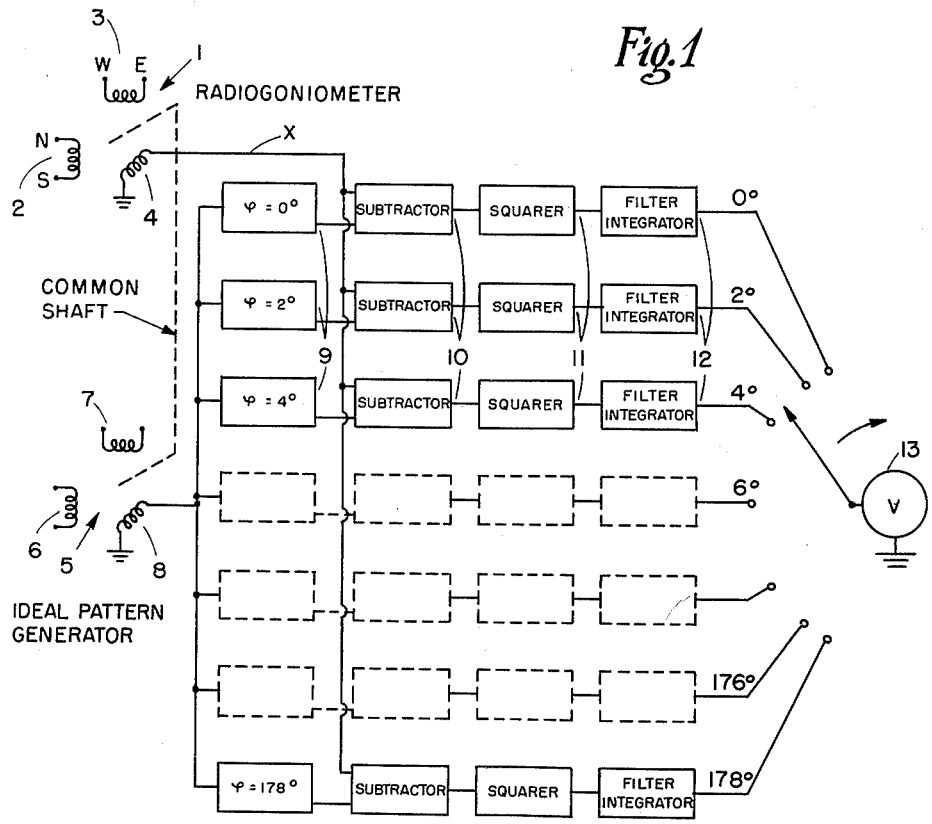

April 3, 1962  A. D. BAILEY  3,028,600
RADIO DIRECTION FINDING SYSTEM
Filed March 17, 1959

Albert D. Bailey INVENTOR.

BY

United States Patent Office

3,028,600
Patented Apr. 3, 1962

3,028,600
RADIO DIRECTION FINDING SYSTEM
Albert D. Bailey, Champaign, Ill., assignor, by mesne assignments, to the United States of America as represented by the Secretary of the Navy
Filed Mar. 17, 1959, Ser. No. 800,068
9 Claims. (Cl. 343—113)

The present invention relates generally to apparatus for and methods of determining the bearing of a radiating electromagnetic energy source and, more particularly, to a radio direction finding system wherein the determination of the direction of the radiating source is accomplished by means of an automatic computing mechanism.

In one class of radio direction finders of the prior art, the problem of locating the direction of the radiating source resolves itself into one of judging the precise location of the symmetrical bisector of a propeller-shaped cathode ray display pattern derived from a spinning radio goniometer. In the final analysis, the accuracy of the bearing is thus dependent to a large degree upon the ability of the operator to establish optically the precise orientation of an imaginary line of symmetry of a changeable and unstable cathode ray pattern. In most cases, this judgment is made the more difficult because of distortion and blurring of the pattern brought about by polarization, multipath and other signal interference effects. Furthermore, in the case of pulse signal reception, the propeller pattern is only piecewise continuous so that the operator must perform the additional step of mentally completing the image pattern before he can carry out his analysis. This further burden increases the margin of error.

It is accordingly a primary object of the present invention to provide a new and improved radio direction finder wherein the determination of the direction of the radio source is made by automatic computing mechanisms.

A secondary object of the present invention is to provide a radio direction finder wherein the bearing determination is not made by a human operator.

A still further object of the present invention is to provide a radio direction finder wherein the bearing determination represents an optimized and integrated statistical data fit by a computer of data supplied by a spinning radio goniometer and an idealized pattern generator.

A still further object of the present invention is to provide a computating mechanism for a radio direction finder which will automatically and electrically match an idealized azimuth bearing pattern to an actual azimuth bearing pattern, thereby to give an indication of the direction of the radio source.

Another object of the present invention is to provide a radio direction finding system having an analogue computer which solves a "least squares" problem to locate the actual azimuth bearing of a source of electromagnetic energy.

A still further object of the present invention is to provide a radio direction finder having an analogue computer which solves a serial "cross correlation" problem to determine automatically the direction of an electromagnetic energy source.

Figure 2:
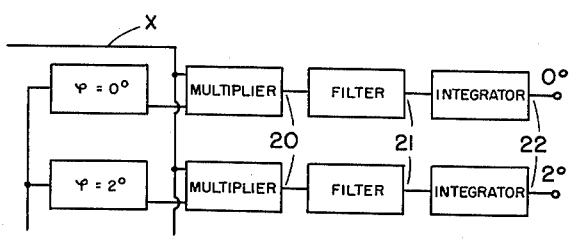

Other objects and many of the attendant advantages of this invention will be readily appreciated as the same becomes better understood by reference to the following detailed description when considered in connection with the accompanying drawings wherein:

FIG. 1 schematically illustrates one modification of the present invention wherein the computer solves the "least squares" integral to locate the bearing; and FIG. 2 schematically illustrates a portion of an analogue computer for use in a system as shown in FIG. 1 for solving the "cross correlation" integral to establish the bearing.

Briefly and in general terms, the present invention accomplishes the above objects by locally generating an idealized version of the wave form developed at the output of the rotor of a conventional spinning radio goniometer and by determining with automatic computating means the best fit between this wave form and the actual wave form received from an operating radio goniometer. In one case, the best superposition is obtained by having an analogue computer solve for a condition of "least squares" fit between these wave forms; in an alternative case, for maximum "cross correlation" fit between these same wave forms. In either case, the optimum fit is established automatically by the computating mechanism and, consequently, the resultant fix is free of any human observer bias.

In the "least squares" procedure, the system operates to match the ideal and actual wave forms so that, as is well known, the sum of the squares of differences is minimized. Let $f(t)$ be the indicated bearing function of time corresponding to the output of the operating radio goniometer and $g(t)$ be the idealized pattern corresponding to that of the wave form developed by the local generator. By definition, the "least square" integral is $$l(\tau) = \frac{1}{T}\int_0^T [f(t) - g(t-\tau)]^2 dt$$

Each value of $\tau$ can be put into one-to-one correspondence with an azimuthal angle, and it will be appreciated that the value of $\tau$ that minimizes the above integral gives the bearing of the radio source.

In the maximum "cross correlation" fit, the system functions to fit the idealized pattern to the actual wave form so that the sum of the products of the two patterns as a function of time is maximized. Again, let $f(t)$ be the indicated bearing function of time and let $g(t)$ be the idealized pattern. By definition the "cross correlation" integral is $$h(\tau) = \frac{1}{T}\int_0^T f(t)g(t-\tau) dt$$

and in this case the optimum fit is realized for that value of $\tau$ that maximizes the integral. Each value of $\tau$ can, like in the previous case, be put into a one-to-one correspondence with a different azimuth angle of arrival to give an indication of the maximized "cross correlation" estimate of the bearing.

Referring to FIG. 1, a conventional radio goniometer, represented generally by reference character 1 and consisting of a pair of stator windings 2 and 3 connected to an Adock antenna array, not shown, produces in normal operation a cyclically varying voltage wave form in rotor 4, the minima positions of this wave form, as is well known, occurring when the angular disposition of the longitudinal axis of winding 4 with respect to those of windings 2 and 3 duplicates the spatial relationship between the direction of the incoming electromagnetic energy and the planes containing the receiving pairs of antennas. As mentioned hereinbefore, this wave form, which may be represented by $f(t)$, is usually distorted by the effects of signal transmission irregularities, and this distortion brings about the irregular display patterns presented on the cathode ray tube component of the prior art systems.

In order to develop the idealized version of this wave form $g(t)$, a signal generator 5, similar in construction to the generating portion of the above radio goniometer, is employed. The rotor 8 of this generator is mechanically coupled to rotor 4 of the goniometer so as to be in rotational synchronism therewith. It will be appreciated that the wave form of the voltage $g(t)$ appearing at the ungrounded side of rotor 8 may be made to conform to that which would be encountered in the output of rotor 4 under idealized signal transmission conditions by selecting the characteristics of the input voltages exciting stators 6 and 7. For example, these voltages may be simply sine waves of different and variable amplitudes and phases which may be independently adjusted. This wave form, it will be understood, will be phased with respect to a given reference direction; that is, its minima points will occur when the rotor of generator 1 is passing through a point in its cycle corresponding to a known signal direction.

As noted hereinbefore, the present system effectively displaces the idealized wave form from a known reference position corresponding to a given azimuthal bearing by $\tau$ increments until it matches a signal wave form generated by the spinning radio goniometer. In one case, the condition of optimum match is indicated by a computing network which solves for a condition whereat the sum of the squares of differences between these wave forms is a minimum.

To carry out the above computation electrically, the idealized wave form at the output of rotor 8, $g(t)$, is fed to a plurality of bearing phase-shift circuits 9. In a preferred embodiment of the invention, there are ninety of these phase-shifters connected with inputs in parallel. Each of these circuits functions to delay the idealized wave form by increasing 2° increments of bearing from 0° to a maximum of 178°. This particular arrangement consequently allows the final fix to be determined to within 2° of azimuth. It will be understood that the bearing phase-shift so introduced is equivalent to the substitution of different values of $\tau$ in the "least square" integral and gives a voltage equal to $g(t-\tau)$. To derive the quantity $f(t)-g(t-\tau)$, the signal from rotor 4 of the radio goniometer and the signals from the phase-shifters are both supplied to the individual input circuit of a corresponding plurality of subtracters 10. Thereafter, the resultant signals are applied to squaring circuits 11 which perform the squaring operation called for in the above integral. This squaring operation, it would be noted, insures that all the signals will have positive values. After squaring, they are sent to an appropriate number of filter integrators which complete the mathematical operations.

The bearing of the radiant energy source can now be determined by examining the outputs of each integrator for a condition of minimum voltage. This can be done by either individual voltmeters, a voltage comparator, or by a single voltmeter 13 successively sampling via a synchronously driven rotary switch the outputs of the different integrators.

It should also be appreciated that the energizing voltages supplied to the stator windings 6 and 7 of the pattern generator may be in one case obtained from a local sinusoidal signal generator whose frequency matches that of the incoming signal. However, perhaps the most convenient method of obtaining these voltages is from the output of a central sense antenna that is usually available at any conventional radio direction finder installation. Such a central sense antenna voltage would provide an exact amplitude replica of the inputs to the radio goniometer 1 and could be used to resolve any ambiguity in direction by standard techniques. If this sense signal is not present, the output of a nondirectional antenna in the neighborhood of the directional antennas may be used. Likewise, it should be appreciated that although two inputs are shown for the ideal pattern generator 5 for purposes of generality, only one input may be needed in a given case. Also, the housing of the pattern generator 5 may be rotated with respect to that of radio goniometer 1 to provide a fixed or variable angular shift. The fixed shift might be necessary for preliminary lineup and calibration; the variable shift for purposes of additional compensation and/or correction. This variable shift could be used to compensate for the effect caused by the elimination of one of the pattern generator input signals.

FIG. 2 discloses two channels of the ninety channels which would replace those of FIG. 1 in order to determine the radio bearing by solving the "cross correlation" integral. In this modification, the outputs from the phase-shifters and the output from the rotor of the radio goniometer are fed first to multiplying circuits 20 to produce quantities corresponding to $f(t)g(t-\tau)$ and then after suitable filtering to integrators 23. In this case, of course, the bearing of the radiant energy source is determined by noting which of the integrator circuits has a maximum voltage in its output. This can be done by an arrangement similar to that used in FIG. 1.

In order to determine which of the two methods described above has the better sensitivity, consider the expansion of the expression for $l(\tau)$ (1) $$l(\tau) = \frac{1}{T}\int_0^T [f(t)-g(t-\tau)]^2 dt$$

squaring (1) gives (2) $$= \frac{1}{T}\int_0^T [f^2(t)-2f(t)g(t-\tau)+g^2(t-\tau)]dt$$

rearranging (2) we get (3) $$= \frac{1}{T}\int_0^T [f^2(t)+g^2(t-\tau)]dt - 2h(\tau)$$

where $h(\tau)$ is the cross correlation, (3) may be expressed as (4) $$= \overline{\overline{f(t)}} + \overline{\overline{g(t)}} - 2h(\tau)$$

where $\overline{\overline{f(t)}}$ is the mean square value of $f(t)$ and $\overline{\overline{g(t)}}$ is the mean square value of $g(t-\tau)$. Because the mean square values are independent of $\tau$ and constant over any period, (5) $$l(\tau) = K - 2h(\tau)$$

and for small incremental changes (6) $$\Delta l(\tau) = -2\Delta h(\tau)$$

Hence, other things being equal, the least squares approach is seen to be twice as sensitive to change in bearing as the cross-relation approach.

It will also be recognized that the two statistical fitting procedures described above may be carried out either prior to detection or after detection of the incoming radio frequency signals. The pre-detection correlation method recommends itself where low signal-to-noise ratio operation is necessary. For post-detection correlation, of course, suitable receiving equipment would be included in the system between the output of the rotor and the input to the computer for amplifying and detecting the signals before their application to the computing circuits.

Obviously many modifications and variations of the present invention are possible in the light of the above teachings. It is therefore to be understood that within the scope of the appended claims the invention may be practiced otherwise than as specifically described.

What is claimed is:

1. In a radio direction finding system of the type in which the radio signal detecting component is a spinning radio goniometer, a local generator for producing a standard wave form which is an idealized version of the envelope of the wave form appearing at the rotor of the radio goniometer, the phase of said standard wave form being fixed with respect to the time at which said rotor occupies a point in its cycle corresponding to a reference spatial direction, means for deriving from said standard wave form a multiplicity of such wave forms with each displaced from another by a fixed increment, the over-all displacement between extreme wave forms being approximately equal to the period of said standard wave form, and means for determining which of said multiplicity of wave forms is in best time coincidence with the envelope of the wave form developed at the rotor of said radio goniometer, the amount of phase displacement between said last-mentioned wave form and said standard wave form being an indication of the angular displacement of the direction of the incoming radio signal from said reference spatial direction.

2. In a radio direction finding system of the type employing a spinning radio goniometer as the signal detecting apparatus, means for locally generating an idealized version of the envelope of the signal which would appear at the rotor of the goniometer but for signal transmission effects, the phase of said idealized wave form being fixed with respect to the time at which said rotor passes through a point in its cycle corresponding to a reference spatial direction, means for deriving from said idealized signal a multiplicity of such signals with each one thereof displaced from another by fixed amounts, means for subtracting each of said signals from a signal having the envelope of the wave form of the signal appearing at the rotor of said goniometer, means for squaring and integrating the resultant signals, and means for providing an indication of the minimum signal so produced, the displacement of that particular signal of said multiplicity of signals which produced said minimum signal as measured from said locally generated idealized signal being proportional to the angular separation of the direction of the incoming radio signal from said reference spatial direction.

3. In a radio direction finding system of the type utilizing a spinning radio goniometer as the radio signal detecting apparatus, means for generating an idealized version of the envelope of the wave form which would appear at the rotor of said goniometer but for signal transmission effects, the phase of said idealized wave form being fixed with respect to the time at which said rotor passes through a point in its cycle corresponding to a reference signal direction, means for deriving from said idealized wave form a multiplicity of such wave forms which are in a time-spaced relationship, and means for determining which of said wave forms of said multiplicity gives a minimum value for the sum of the difference squares when compared with the envelope of the wave form appearing at the rotor of said goniometer, the spacing of said last-mentioned wave form from the generated idealized wave form representing the angular displacement of said incoming radio signal from said reference direction.

4. In a radio direction finding system of the type employing a spinning radio goniometer as the radio signal generating apparatus, means for generating a wave form which represents the envelope of the signal which would be developed at the rotor of said goniometer if signal transmission effects were not present, the phase of this wave form being fixed with respect to the time at which said rotor is at a point in its cycle corresponding to a reference signal direction, means for producing from said wave form a multiplicity of such wave forms with each one thereof equally spaced from another by a small fraction of the period of said wave form, and means for determining which of said multiplicity of wave forms is in best time coincidence with the envelope of the wave form actually appearing at said rotor, the displacement of that particular wave form from the generated wave form being indicative of the bearing of the incoming radio signal from said reference direction, said condition being obtained by an analogue computer which solves the "least square" integral.

5. In a radio direction finding system of the type employing a spinning radio goniometer as the radio signal generating apparatus, means for generating a wave form which represents the envelope of the signal which would be developed at the rotor of said goniometer if signal transmission effects were not present, the phase of this wave form being fixed with respect to the time at which said rotor is at a point in its cycle corresponding to a reference signal direction, means for producing from said wave form a multiplicity of such wave forms with each one thereof equally spaced from another by a small fraction of the period of said wave form, and means for determining which of said multiplicity of wave forms is in best time coincidence with the envelope of the wave form actually appearing at said rotor, the displacement of that particular wave form from the generated wave form being indicative of the bearing of the incoming radio signal from said reference direction, said condition being obtained by an analogue computer which solves the "cross correlation" integral.

6. In a radio direction finding system of the type employing a spinning radio goniometer as the signal detecting means, means for generating an idealized version of the envelope of the wave form appearing at the output of the rotor of the goniometer, the phase of said idealized wave form being fixed with respect to the time at which said rotor occupies a position in its cycle corresponding to a reference signal direction, a multiplicity of phase shifters, each of said phase shifters delaying signals coupled thereto by increasing amounts, means for applying said idealized wave form to the inputs of said phase shifters, a similar multiplicity of subtracting circuits, means for coupling the output of each phase shifter to the input of a different subtracting circuit, means for coupling the voltage wave form appearing at the rotor of said goniometer to the other inputs of said subtracting circuits, a similar multiplicity of squaring circuits, means for coupling the signal in the output of each subtracting circuit to a different one of said squaring circuits, a similar multiplicity of integrating circuits, means for coupling the signal in the output of each squaring circuit to a different one of said integrating circuits, and means for indicating which particular integrating circuit develops the minimum output signal.

7. In a radio direction finding system of the type employing a spinning radio goniometer as the signal detecting means, means for generating an idealized version of the envelope of the wave form appearing at the output of the rotor of the goniometer, the phase of said idealized wave form being fixed with respect to the time at which said rotor occupies a position in its cycle corresponding to a reference signal direction, a multiplicity of phase shifters, each of said phase shifters delaying signals coupled thereto by increasing amounts, means for applying said idealized wave form to the inputs of said phase shifters, a similar multiplicity of multiplying circuits, means for coupling the output of each phase shifter to the input of a different multiplying circuit, means for coupling the voltage wave form appearing at the rotor of said goniometer to the other inputs of said multiplying circuits, a similar multiplicity of integrating circuits, means for coupling the output of each multiplying circuit to a different one of said integrating circuits, and means for indicating which of said integrating circuits develops the maximum output signal.

8. A radio direction finding system of the type employing a radio goniometer as the signal detecting means, which goniometer includes a pair of stationary windings each excited from a pair of vertical antennas and a rotating pickup winding, means for generating an idealized version of the envelope of the voltage wave form which would appear across said pickup winding in response to the detection of an incoming radio signal but for distortions brought about by propagation effects, said generating means including a pair of stationary primary windings disposed at right angles to each other, a rotating secondary winding inductively coupled to said primary windings and rotating in synchronism with said pickup winding, and means for energizing said primary windings such that the voltage occurring across said secondary winding has a phase fixed with respect to the time at which said pickup winding passes through a predetermined point in its cycle indicative of a preselected spatial direction, means for shifting the phase of said idealized wave form by incremental increasing amounts of its period, and means for determining which of the shifted wave form is in best time coincidence with the envelope of the wave form developed across said pickup winding, the amount of shift imparted to said last-mentioned wave form providing an indication of the angular displacement of the direction of the incoming radio signal from said preselected spatial direction.

9. A radio direction finding system of the type employing a radio goniometer as the signal detecting means, which goniometer includes a pair of stationary windings each excited from a pair of vertical antennas and a rotating pickup winding, means for generating an idealized version of the envelope of the voltage wave form which would appear across said pickup winding in response to the detection of an incoming radio signal but for distortions brought about by propagation effects, said generating means including a pair of stationary primary windings disposed at right angles to each other, a rotating secondary winding inductively coupled to said primary windings and rotating in synchronism with said pickup winding, and means for energizing said primary windings such that the voltage occurring across said secondary winding has a phase fixed with respect to the time at which said pickup winding passes through a predetermined point in its cycle indicative of a preselected spatial direction, means for shifting the phase of said idealized wave form by given increments through a complete period, and means for providing an indication of the amount of shift imparted to said idealized wave form when it best matches the envelope of the wave form appearing across said pickup winding.

References Cited in the file of this patent

UNITED STATES PATENTS

| | | |
|---|---|---|
| 2,695,406 | Byatt | Nov. 23, 1954 |
| 2,701,875 | Baltzer | Feb. 8, 1955 |
| 2,879,506 | Byatt | Mar. 24, 1959 |
| 2,946,998 | Jolliffe et al. | July 26, 1960 |